United States Patent [19]
Sayer

[11] Patent Number: 5,795,034
[45] Date of Patent: Aug. 18, 1998

[54] METHOD OF PRODUCING A WELDED ASSEMBLY

[75] Inventor: John Sayer, Bridgnorth, England

[73] Assignee: GKN Sankey Limited, Telford, United Kingdom

[21] Appl. No.: 449,691

[22] Filed: May 24, 1995

[30] Foreign Application Priority Data

May 25, 1994 [GB] United Kingdom ............... 9410516

[51] Int. Cl.[6] ................................................ B60B 21/06
[52] U.S. Cl. ....................... 301/9.2; 301/11.1; 29/894.352
[58] Field of Search ................................ 301/9.1, 10.1, 301/9.2, 11.1, 11.3, 35.62; 29/894, 894.321, 894.322, 894.352

[56] References Cited

U.S. PATENT DOCUMENTS

| | | | |
|---|---|---|---|
| 4,883,324 | 11/1989 | Ruchs et al. | 301/9.2 |
| 4,925,248 | 5/1990 | Aderer | 301/9.2 |
| 5,067,776 | 11/1991 | Aderer | 301/9.2 |
| 5,560,686 | 10/1996 | Sayer et al. | 301/9.2 |

FOREIGN PATENT DOCUMENTS

| | | | |
|---|---|---|---|
| 834045 | 5/1960 | United Kingdom | 301/9.2 |
| 2 058 686 | 4/1981 | United Kingdom . | |
| 2167717 | 6/1986 | United Kingdom | 301/9.2 |

*Primary Examiner*—Russell D. Stormer
*Attorney, Agent, or Firm*—Marshall, O'Toole, Gerstein, Murray & Borun

[57] ABSTRACT

A method of producing a welded assembly comprising two members and wherein the assembly is adapted subsequently to have an element connected thereto in a manner that imparts a connection force to the welded connection between the two members and the method comprising the steps of, prior to welding the two members together, temporarily applying a force to at least one of the two members to simulate the force which is to be imparted to the welded connection between the two members as a result of the connection of the further element to the assembly, welding the two members together to form the assembly while maintaining the predetermined force on the at least one member and subsequently removing the predetermined force from the at least one member.

4 Claims, 1 Drawing Sheet

METHOD OF PRODUCING A WELDED ASSEMBLY

BACKGROUND OF THE INVENTION

This invention relates to a method of producing a welded assembly. The invention has been devised particularly but not exclusively for use in making a wheel construction such as for a wheel of an agricultural vehicle or tractor.

Wheel constructions are well known for example from GB 2058686 which comprise a wheel rim onto which a tyre is fitted, and a wheel disc which has openings to receive fasteners by which the wheel can be attached to a drive shaft of a tractor or other vehicle.

The wheel disc is connected to the wheel rim by means of a plurality e.g. four, lugs which are spaced around the circumferential inner surface of the rim and are welded to that surface and are adapted to receive bolts which pass through openings in the wheel disc. The disc is dished so that the connection to the wheel rim is offset axially from the connection to the drive shaft. By bolting the wheel disc to the lugs, in different arrangements, the position of the centre of the wheel disc along the wheel axis relative to the rim can be varied for different applications.

In such construction when the wheel disc is bolted to a lug a certain torque is applied which results in a connecting force being imparted to the welded connection between the lug and the rim. This can cause stresses in the welded connection which ultimately could result in the weld failing in use.

SUMMARY OF THE INVENTION

According to one aspect of the invention we provide a method of producing a welded assembly comprising two members wherein the assembly is adapted subsequently to have an element connected thereto in a manner that imparts a connection force to the welded connection between the two members, the method comprising the steps of prior to welding the two members together, temporarily applying a force to at least one of the two members to simulate the connection force which is to be imparted to the welded connection between the two members as a result of the connection of the further element to the assembly, welding the two members together to form the assembly whilst maintaining the temporary force on the at least one member, and subsequently removing the temporary force from the at least one member.

Thus by utilising the method of the invention a welded assembly is produced wherein, in the case of a wheel construction as described above, when the temporary force is released after welding, the welded connection may be subject to stresses, but these stresses are relieved when the connection force is applied with the result that in use the weld sites are subjected to reduced stresses compared with the stresses to which they would be subject had the temporary force not been imparted to the at least one member during the welding operation.

In a wheel construction, the bolting of the wheel disc (further element) to the lug (one member) imparts a restoring connection force to the weld site to relieve any stresses arising as a result of the temporary force having been removed.

Thus the resultant welded assembly offers great durability under substantial fatigue loading as the wheel construction is used.

The temporary force may be applied to the at least one member by a clamping means or by hydraulic or pneumatic pressure means, by weights, or any other desired means. However the magnitude of the temporary force which is applied to the at least one member is preferably predetermined from the magnitude of the connection force which is to be imparted to the welded connection between the two members as a result of the connection of the further element to the assembly.

By applying a known torque to a nut/bolt connection connecting the further element to the assembly, the connection force can be determined. The temporary force to be applied to the at least one member during welding may be substantially the same as, greater to, or less than the calculated connection force depending on circumstances, although in each case the temporary force applied would simulate the connection force which is subsequently to be imparted to the welded connection.

During welding, when the temporary force is applied to the at least one member, the at least one member may be retained in a set position relative to the other member, and when the temporary force is subsequently removed, the at least one member may be permitted to deflect relative to the other member until connection of the further element to the assembly. When the connection force is imparted to the connection this will tend to return the at least one member to the set position relative to the other member.

As a result, the overall geometrical accuracy of the welded assembly will thus be improved when produced by the method of the invention.

Particularly but not exclusively where the invention is applied to a wheel construction, the at least one member may be generally U-shaped configuration having a pair of opposed limbs each with a free end which is to be welded to the other member of the welded assembly, and the method of the invention may comprise holding the two opposed limbs in compression relative to one another to apply the temporary force before and during welding of the ends of the limbs to the other member. Thus when the temporary force is released, the limbs of the U-shaped member will tend to spring apart but this will be prevented by the welded connection. When the further element is connected to the U-shaped member e.g. by fastener means which tend to urge the limbs towards one another again, the resultant stresses in the welded connection will be relieved.

Hence the compressive temporary force may in this example be applied by a clamping means comprising a bolt a shank of which may be inserted into aligned openings in the limbs and onto which a nut may be tightened to a predetermined torque in order to apply a predetermined temporary force.

According to a second aspect of the invention we provided a welded assembly produced by a method according to the first aspect of the invention.

According to a third aspect of the invention we provide a wheel construction including a welded assembly according to the second aspect of the invention. In such a wheel construction, the at least one member may be a lug, and the other member a wheel rim. The further element may comprise a wheel disc connected to the wheel rim via a plurality of lugs, there being fastener means which impart the connection force to the welded connection of at least one of the lugs to the wheel rim. Preferably, the fastener means comprises a nut and bolt.

BRIEF DESCRIPTION OF THE DRAWINGS

Other features of the invention will become apparent from the following description given herein solely by way of example with reference to the accompanying drawings wherein.

DESCRIPTION OF THE PREFERRED EMBODIMENTS

Figure 1:
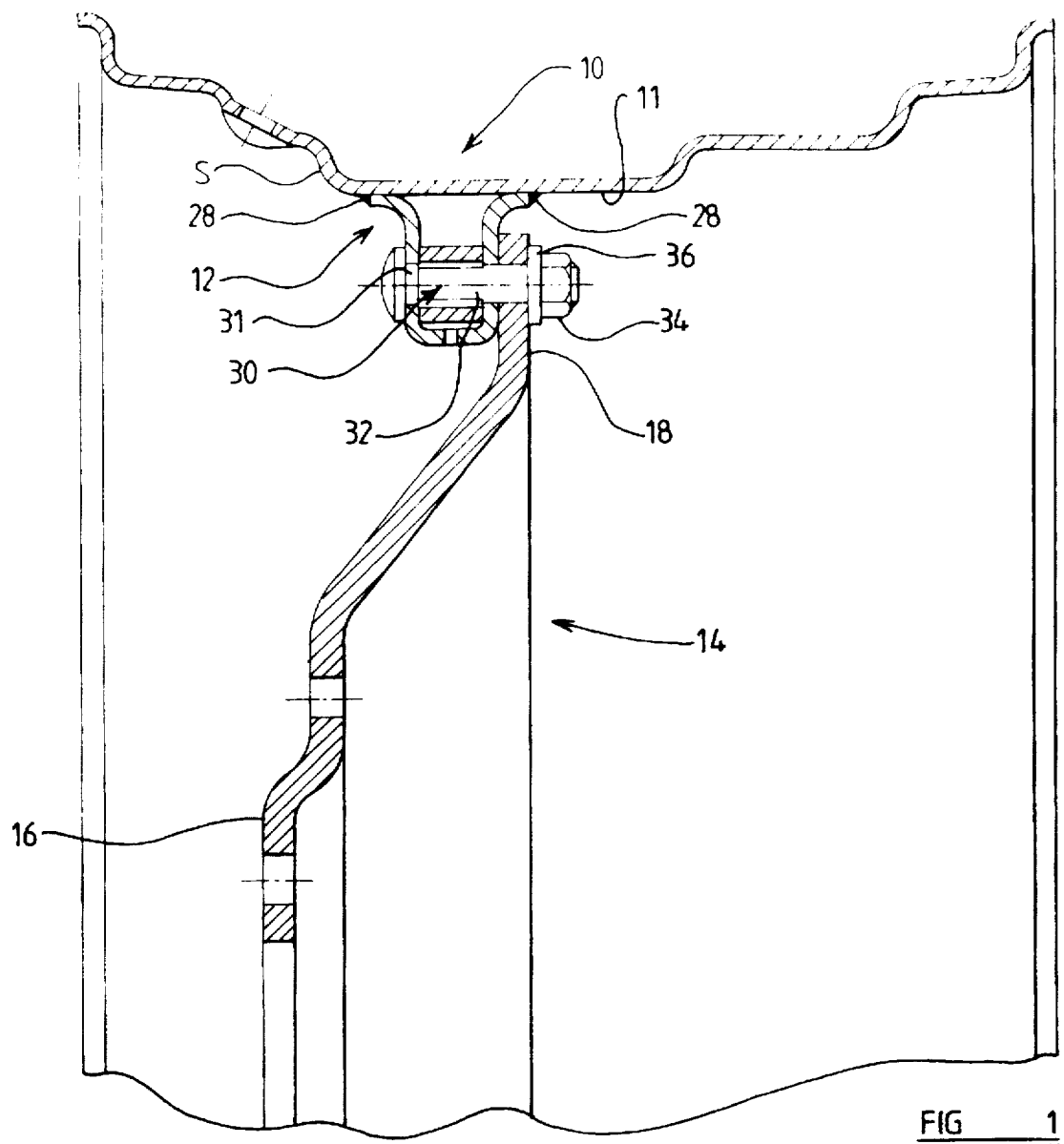
FIG. 1 is a radial cross-sectional view through part of a wheel construction showing a part of a wheel disc secured by bolting to a lug with the lug being welded to a radially inner surface of a rim well by a method in accordance with the invention.

Referring to the drawings there is shown a wheel construction for a wheel of an agricultural tractor having welded assemblies comprising a wheel rim 10 with a plurality of lugs 12 welded thereto. The wheel rim 10 may have for example four circumferentially spaced apart lugs 12 secured to a radially inner surface 11 of the rim 10 thereof by welding.

A wheel disc 14 of the construction, which in this example is generally octagonal in configuration, has a central planar portion or nave 16 securable in known manner by bolting to a drive shaft of the tractor. Radially outwardly of the nave 16 the wheel disc 14 has a rim portion 18 which is generally perpendicular to the rotary axis of the wheel and, as is known for example from GB-A-2 058 686. Each of such rim portions may provide a shorter side of the generally octagonal disc 14.

Each of the lugs 12 is of generally channel-shaped top hat cross-section as illustrated having generally parallel opposed planar side walls 20 extending circumferentially of the wheel rim 10 and having axially outwardly directed feet 22 securable to the radially inner surface 11 of a well portion of the wheel rim 10.

As illustrated, each of the opposed side walls 20 of each lug 12 is formed with one is more axially outwardly displaced boss portions 24 and internally of each lug 12 there is provided a strut or struts typically in the form of a tube 26 or tubes which are located within the lug 12 during formation thereof by means of opposed recesses provided by the axially outwardly displaced boss portions 24.

Each lug 12 is secured to the radially inner surface 11 of the wheel rim 10 by circumferentially extending fillet welding 28 along the axially outer edges of the lug feet 22. If desired, fillet welding may also be provided to extend axially around the corners of each end of each lug foot 22.

Figure 2:
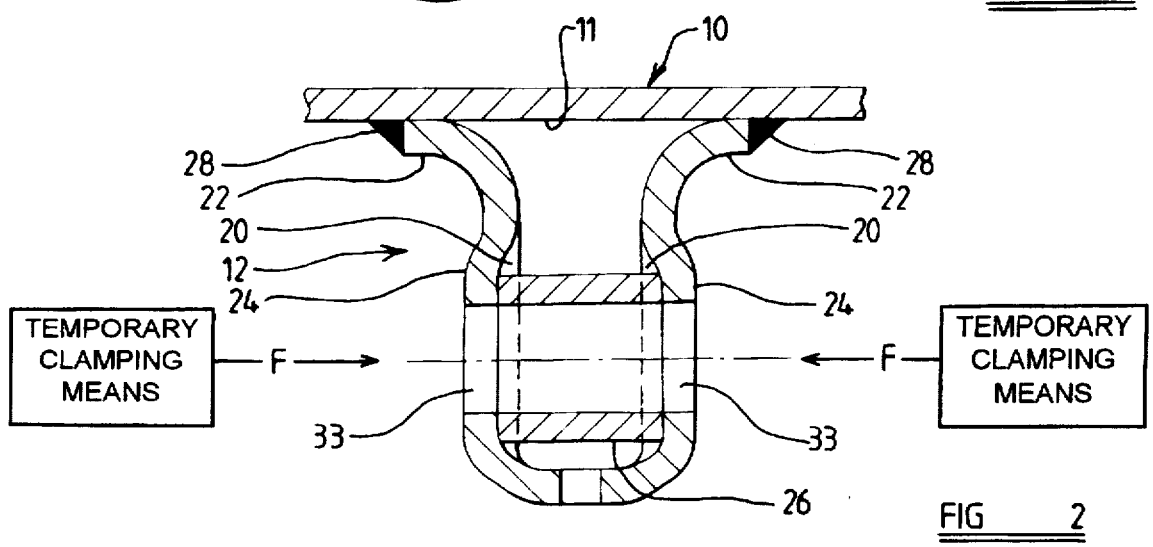
FIG. 2 is a detailed cross-sectional view of the lug shown in FIG. 1, to an enlarged scale and prior to connection to the wheel disc.

In accordance with the invention, a predetermined force is applied to the lug 12 before and during the welding operation and, as illustrated in FIG. 2, a compressive clamping force F is applied to the opposed side walls 20 of each lug 12 prior to and during the welding operation. After welding has been completed, the clamping force F is removed.

The clamping force F may be applied by inserting a temporary bolt (or bolts) through the tube 26 (or tubes 26) and tightening a nut on the or each bolt to a predetermined torque so as to apply a known temporary clamping force to the lug 12 before and during the welding operation. The temporary bolt or bolts are removed after welding to enable the wheel disc 14 to be connected to the lugs 12.

A clamping force may alternatively be provided before and during welding by a hydraulic or pneumatic pressure, a screw press, by applying weights or by any suitable means which is removable after welding.

After each lug 12 is welded to the wheel rim 10, each shorter side rim portion 18 of the wheel disc 14 is secured to a respective lug 12 by one or more bolts 30 which are each received by the or a respective tube 26.

Each bolt 30 preferably has a squared portion 31 on its shank 32 to engage in a square section hole 33 in each of the opposed walls 20 of the respective lug 12, each bolt 30 having a threaded portion to receive a nut 34 and washer 36.

When the bolts 30 are tightened to secure the wheel disc 14 to the rim 10, a compressive clamping force will be applied to the opposed side walls 20 of each lug 12. The predetermined force F which was applied to each lug 12 prior to and during the welding of the lug to the wheel rim will have been calculated from the known compressive forces to which each lug 12 will be subjected during the bolting of the wheel disc 14 thereto i.e. the predetermined force F simulates the real compressive force to which the lug 12 is subjected in the final wheel construction. Thus the weld sites 28 are in use subject to reduced stresses when the wheel disc 14 is bolted to the lugs 12 compared with the stresses to which they would have been subjected by the bolts 30 had the lugs 12 not been held in compression during the welding operation.

The invention provides a further advantage in that it has been found the geometrical accuracy of the lug 12/wheel rim 14 connection can be improved compared with arrangements in which the lug 12 is not held in compression during welding. This is presumed to be because the clamping force F applied holds the lug 12 in the shape it will adopt when subjected to the forces applied by the bolt 30 or bolts in the final wheel construction.

Although in the example described the invention has been applied to a lug 12 of a wheel construction which lugs 12 has outwardly extending feet 22 which are welded to the rim 10, in another example such feet 22 may not be provided, or may be inwardly directed, in which case the weld sites 28 may be between the parts of the side walls or limbs 20 of the lugs 12 which extend transversely to the rim 10, and the rim 10.

The side walls 20 of the lugs 10 need not each be of the same length as shown, but in another example e.g. where the lugs 12 are positioned adjacent a step S of the wheel rim 10, the limbs 20 may be of unequal lengths.

In another example, struts 26 need not be provided internally of the lugs 12, but the limbs 20 of the lugs 12 may otherwise be constructed to resist the compressive forces to be imposed by connecting bolts 30 when the wheel disc 14 is connected thereto.

Although the invention has been described with specific reference to a welded assembly of a wheel construction, for which the invention was specifically developed, the invention may be applied to other situations and indeed to many different forms of welded assembly where subsequent to welding, a connection force is to be imposed to a welded connection. Of course in every situation, the direction, position and magnitude of temporary force to be applied to the at least one member of the welded assembly would need carefully to be chosen to simulate the connection forces to which the welded assembly is subsequently to be subjected.

I claim:

1. A welded wheel construction comprising:
    a wheel rim having an inner surface, a wheel disc, and a plurality of U-shaped lugs for mounting said wheel disc to said wheel rim at said inner surface using respective threaded fasteners applying a compressive force F to said lugs;
    each of said U-shaped Lugs having a reinforced central boss and feet directed outwardly from said reinforced central boss and said feet having respective feet ends, said reinforced central boss resisting said compressive force F;

said lugs spaced around said wheel rim with only said respective feet ends of said feet engaging solely said inner surface of said wheel rim and said feet otherwise not engaging said wheel rim;

temporary clamping means applied to said reinforced central boss applying a temporary clamping force F substantially equal to said compressive force F and opposed by said reinforced central boss to move and maintain said feet in a compressed set position with said feet ends on said inner surface while welding said feet ends at respective weld joints to said inner surface of said wheel rim;

said feet being deflected from said compressed set position upon the removal of said temporary clamping force to provide resultant stresses in said weld joints; and said resultant stresses in said weld joints being relieved upon applying said threaded fasteners to said wheel disc and reinforced central boss to return said feet to said compressed set position, whereby the weld joints are subjected to reduced stresses when said threaded fasteners are applying said compressive forces F compared to if the lugs had not been subject to said temporary clamping force F during welding of said weld joints.

2. A welded wheel construction according to claim 1, wherein said reinforced central boss includes a reinforced outwardly displaced central boss portion.

3. A welded wheel construction according to claim 1, wherein said reinforced central boss includes struts captured within said central boss.

4. A welded wheel construction according to claim 3, wherein said struts comprise tubes.

* * * * *

UNITED STATES PATENT AND TRADEMARK OFFICE
CERTIFICATE OF CORRECTION

PATENT NO. : 5,795,034
DATED : August 18, 1998
INVENTOR(S) : John Sayer

It is certified that error appears in the above-identified patent and that said Letters Patent is hereby corrected as shown below:

Column 4, line 63, "Lugs" should read --lugs--.

Column 6, line 5, "subject" should read --subjected--.

Signed and Sealed this

Second Day of May, 2000

*Attest:*

Q. TODD DICKINSON

*Attesting Officer*     *Director of Patents and Trademarks*